(12) United States Patent
Taketomi et al.

(10) Patent No.: US 7,872,733 B2
(45) Date of Patent: Jan. 18, 2011

(54) TRACKING TYPE LASER INTERFEROMETER AND METHOD FOR RESETTING THE SAME

(75) Inventors: Naoyuki Taketomi, Tsukuba (JP); Sinichirou Yanaka, Tsukuba (JP)

(73) Assignee: Mitutoyo Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/141,487

(22) Filed: Jun. 18, 2008

(65) Prior Publication Data
US 2008/0316497 A1 Dec. 25, 2008

(30) Foreign Application Priority Data
Jun. 20, 2007 (JP) ............................. 2007-162295

(51) Int. Cl.
*G01C 3/08* (2006.01)

(52) U.S. Cl. ..................................... 356/4.09

(58) Field of Classification Search .................. 356/498, 356/496, 493, 4.09, 486
See application file for complete search history.

(56) References Cited

U.S. PATENT DOCUMENTS

| | | | |
|---|---|---|---|
| 4,714,339 A | | 12/1987 | Lau et al. |
| 6,133,998 A | * | 10/2000 | Monz et al. ............... 356/141.4 |
| 6,147,748 A | | 11/2000 | Hughes |
| 6,734,952 B2 | * | 5/2004 | Benz et al. .................. 356/5.01 |
| 2007/0024861 A1 | * | 2/2007 | Yanaka et al. ............... 356/498 |

FOREIGN PATENT DOCUMENTS

| | | |
|---|---|---|
| DE | 197 33 491 | 2/1999 |
| EP | 1 061 335 | 12/2000 |
| EP | 1 329 691 | 7/2003 |
| EP | 1 750 085 | 2/2007 |
| JP | 07-120213 | 5/1995 |
| JP | 2007-57522 | 3/2007 |

* cited by examiner

*Primary Examiner*—Tarifur Chowdhury
*Assistant Examiner*—Jonathan M Hansen
(74) *Attorney, Agent, or Firm*—Rankin, Hill & Clark LLP

(57) ABSTRACT

A tracking type laser interferometer that detects displacement of a retroreflector 300 being an object to be measured by utilizing interference of a laser beam 102 irradiated onto the retroreflector 300 and reflected by the retroreflector 300 in the returning direction, and carries out tracking by means of a two-axis turning mechanism 240 using displacement in the position of the optical axis of the laser beam 102; the same tracking type laser interferometer, includes; a light irradiator 600 that emits a fan-shaped laser light 602 that is fan-shaped including the optical axis of the laser beam 102, is interlocked with turning movements of the two-axis turning mechanism 240 around an axis orthogonal to the center axis of the corresponding fan shape; and a light receptor 620 that has a specific positional relationship with the retroreflector 300 or the light irradiator 600 and receives the fan-shaped laser light. Thereby, tracking can be automatically reset when the tracking is disabled due to a reason such as interruption of laser light or initial adjustment work can be automated when commencing measurement.

10 Claims, 4 Drawing Sheets

→ P polarization (polarization parallel to page)
● S polarization (polarization perpendicular to page)
○ Circular polarization
✗ Interfering light
→ Light, electric signal transmitting direction

TRACKING TYPE LASER INTERFEROMETER AND METHOD FOR RESETTING THE SAME

CROSS-REFERENCE TO RELATED APPLICATION

The disclosure of Japanese Patent Application No. 2007-162295 filed on Jun. 20, 2007 including specifications, drawings and claims is incorporated herein by reference in its entirety.

BACKGROUND OF THE INVENTION

1. Field of the Invention

The present invention relates to a tracking type laser interferometer and a method for resetting the same, and in particular, to a tracking type laser interferometer and a method for resetting the same, which are preferable for a tracking type laser interferometer that detects displacement of a retroreflector being an object to be measured by utilizing interference of a laser beam, which is irradiated onto the retroreflector and is reflected by the retroreflector in the returning direction, and carries out tracking by means of a two-axis turning mechanism using a change in the position of the optical axis of the laser beam, and are capable of automatically resetting the laser interferometer to a tracking state even if the tracking is made impossible due to interruption of the laser beam, etc., or are capable of automating initial adjustment work when measurement is commenced.

2. Description of the Related Art

Tracking type laser interferometers that were disclosed by Japanese Published Unexamined Patent Application No. 2007-057522 (Patent Document 1), Japanese Patent No. 2603429 (Patent Document 2), and U.S. Pat. No. 6,147,748 (Patent Document 3) are available as a tracking type laser interferometer that measures the displacement and position of a moving body with high accuracy while tracking the moving body. Representatively, a description is given of a case where a homodyne Michelson type laser interferometer is employed that is described in Patent Document 1, using FIG. 1 and FIG. 2.

FIG. 1 is a perspective view showing the entire configuration of a conventional tracking type laser interferometer, and FIG. 2 is a brief configurational view showing the portion of an interferometer, respectively.

As shown in FIG. 1, a tracking type laser interferometer according to Patent Document 1 includes a light source portion 100, a main body portion 200, a retroreflector 300, a circuit portion 400 and a personal computer (PC) 500.

The light source portion 100 includes a frequency stabilized He—Ne laser light source 110, a lens 120 and an optical fiber 130.

The main body portion 200 includes a measurement portion 220, a two-axis turning mechanism 240, a reference sphere 260, and a base 280. The two-axis turning mechanism 240 is fixed on the base 280, and the measurement portion 220 is fixed on the two-axis turning mechanism 240. And, the reference sphere 260 is fixed on the base 280, and the center of the reference sphere 260 is made coincident with the center of turning of the two-axis turning mechanism 240.

Herein, the measurement portion 220 includes a displacement gauge 221 and an interferometer 230. And, the interferometer 230 includes, as shown in FIG. 2, a collimator lens 231, a polarization beam splitter (PBS) 232, λ/4 plates 233, 236, a planar mirror 234, a non-polarization beam splitter (NPBS) 235, a polarization plate 237, a two-dimensional PSD (Position Sensing Detector) or a quadruplicate divisional photo diode (QPD) 238, and a detector 239. The two-axis turning mechanism 240 includes a carriage 242, an elevation angle motor 244, and an azimuth angle motor 246.

The circuit portion 400 includes signal processing circuits 410 through 430 and motor drive circuits 440 and 450.

Hereinafter, a description is given of the actions thereof, using FIG. 1 and FIG. 2.

A laser beam incident into the interferometer 230 is emitted from the frequency stabilized He—Ne laser light source 110, and is made incident into the interferometer 230 through the lens 120 and the optical fiber 130. A laser beam incident into the interferometer 230 is split into two by the PBS 232, one of which is used as reference light for measurement of length, and the other of which is emitted to the retroreflector 300. The laser beam 102 emitted to the retroreflector 300 is again made incident into the interferometer 230 having the λ/4 plate 236 after being reflected by the retroreflector 300. The laser beam 102 that is again made incident into the interferometer 230 is split into two by means of the NPBS 235, one of which interferes with the reference light as measurement light. The detector 239 detects a change in intensity of the interference light, and the change in intensity is processed by the signal processing circuit 410, wherein displacement $\Delta L1$ between the retroreflector 300 and the interferometer 230 is measured by using the PC 500. The displacement gauge 221 is an electrostatic capacitance type displacement gauge or an eddy current type displacement gauge, which detects displacement with respect to the reference sphere 260, and the displacement is processed by the signal processing circuit 420, wherein the displacement $\Delta L2$ between the reference sphere 260 and the displacement gauge 221 is measured by using the PC 500. By adding $\Delta L1$ to $\Delta L2$ on the PC 500, it is possible to obtain displacement $\Delta L$ between the retroreflector 300 and the reference sphere 260.

On the other hand, another laser beam 102 which is split into two by the NPBS 235 is made incident into the QPD 238 that is capable of detecting the distance (hereinafter referred to as a "tracking error amount $\Delta Tr$) between the optical axis of the laser beam 102 incident into the retroreflector 300 and the center position of the retroreflector 300. Herein, the QPD 238 can measure the $\Delta Tr$ in terms of dividing the component in two directions orthogonal to each other. For example, as shown in FIG. 1, where it is assumed that the optical axis of the laser beam 102 emitted from the interferometer 230 is a Z axis, the axis in the horizontal direction, which is perpendicular to the Z axis, is an X axis, and the axis orthogonal to the Z axis and X axis is a Y axis, the QPD 238 can detect the X-axis direction component $\Delta TrX$ and the Y-axis direction component $\Delta TrY$ with respect to $\Delta Tr$. Therefore, signals responsive to the $\Delta TrX$ and $\Delta TrY$ are brought into the PC 500 via the signal processing circuit 430, and control signals responsive to the values of $\Delta TrX$ and $\Delta TrY$ are given to the motor drive circuits 440 and 450. In response to the control signals thus given, the motor drive circuits 440 and 450 drive the elevation angle motor 244 and the azimuth angle motor 246 and rotates the carriage 242 in the elevation angle direction and the azimuth angle direction, wherein the center position of the retroreflector 300 and the optical axis of the laser emitted from the interferometer 230 are controlled so as to become coincident with each other in order to carry out tracking.

However, there may be cases where a conventional homodyne tracking type laser interferometer that is represented by the invention disclosed in Patent Document 1 described above becomes unable to track the position of the retroreflector 300 when the laser light is interrupted due to existence of an obstacle between the interferometer 230 and the retroreflector 300 and when the laser light is interrupted due to other reasons. In these cases, it is necessary for an operator to go to the tracking type laser interferometer and to adjust either one of the position of the retroreflector 300 or the emission direction of the laser emitted from the laser interferometer 230 so that the laser beam 102 can be irradiated from the position of the main body portion 200 having the interferometer 230 onto the retroreflector 300 and the QPD 238 existing in the interferometer 230 can detect the reflection light from the retroreflector 300. In addition, since the work is manually carried out, a change in temperature and generation of vibrations and foreign substances due to movement of a human being at this time become factors to change the measurement environment, wherein it adversely influences highly accurate measurement. And, since the measurement is also manually commenced by executing initial adjustment work after the tracking type laser interferometer is installed, a similar problem exists.

And, such a situation is not unique to Patent Document 1, wherein it is a common problem to Patent Documents 2 and 3.

SUMMARY OF THE INVENTION

The present invention was developed in order to solve the above-described conventional problems, and it is therefore an object of the invention to provide a tracking type laser interferometer and a method for resetting the same, which is capable of automatically resetting tracking when tracking becomes impossible due to a reason such as interruption of the laser light, etc., or automating initial adjustment work when commencing measurement, in a tracking type laser interferometer.

The present invention solves the object by providing a tracking type laser interferometer with a light irradiator that emits a fan-shaped laser light that is fan-shaped including the optical axis of the laser beam, and is interlocked with turning movements of the two-axis turning mechanism around an axis orthogonal to the center axis of the fan shape, and a light receptor that has a specific positional relationship with the retroreflector or the light irradiator and receives the fan-shaped laser light, in the tracking type laser interferometer that detects displacement of a retroreflector by utilizing interference of a laser beam irradiated onto a retroreflector being an object to be measured and reflected by the corresponding retroreflector in the returning direction, and carries out tracking by means of the two-axis turning mechanism using a change in the position of the optical axis of the laser beam.

The present invention also provides a method for resetting a tracking type laser interferometer that detects displacement of a retroreflector being an object to be measured by utilizing interference of a laser beam, which is irradiated onto a retroreflector and is reflected by the corresponding retroreflector in the returning direction, and carries out tracking by means of the two-axis turning mechanism using a change in the position of the optical axis of the laser beam, wherein the method includes the steps of: emitting a fan-shaped laser light having a fan shape on a plane including the optical axis of the laser beam from a light irradiator secured on the two-axis turning mechanism when the tracking control is not carried out; executing a turning movement centering around the axis orthogonal to the fan-shaped center axis of the two-axis turning mechanism; detecting the fan-shaped laser light in a light receptor having a specific positional relationship with the retroreflector or the light irradiator, obtaining the first turning angle by which tracking control is enabled, and moving to a first turning angle by turning centering around the axis orthogonal to the center axis of the corresponding fan shape; executing turning movements of the remaining axes with the first turning angle maintained; detecting the laser beam, obtaining a second turning angle by which tracking control is enabled, and moving to a second turning angle by turning centering around the remaining axes, wherein the tracking control is enabled.

The above-described light receptor may be secured at the retroreflector.

In addition, the light receptor may be provided in the two-axis turning mechanism.

Also, the light receptor may be fixed so that the optical axis when the fan-shaped laser light is emitted to the retroreflector and the optical axis when the laser light is reflected by the retroreflector and is received by the light receptor are common to each other at least on a part of the optical path.

In addition, the light irradiator and the light detector including the light receptor may be provided in the two-axis turning mechanism.

According to the present invention, by providing a light irradiator and a light receptor to the configuration of the conventional laser interferometer, it becomes possible to automatically reset tracking without any manual work when the tracking is disabled due to a reason such as interruption of laser light. In addition, it is possible to automatically carry out initial adjustment work when measurement is commenced.

Therefore, since environmental fluctuations due to intervention of a human being can be prevented, further accurate and stable measurement can be carried out.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, a detailed description is given of embodiments of the present invention with reference to the drawings.

Figure 3:
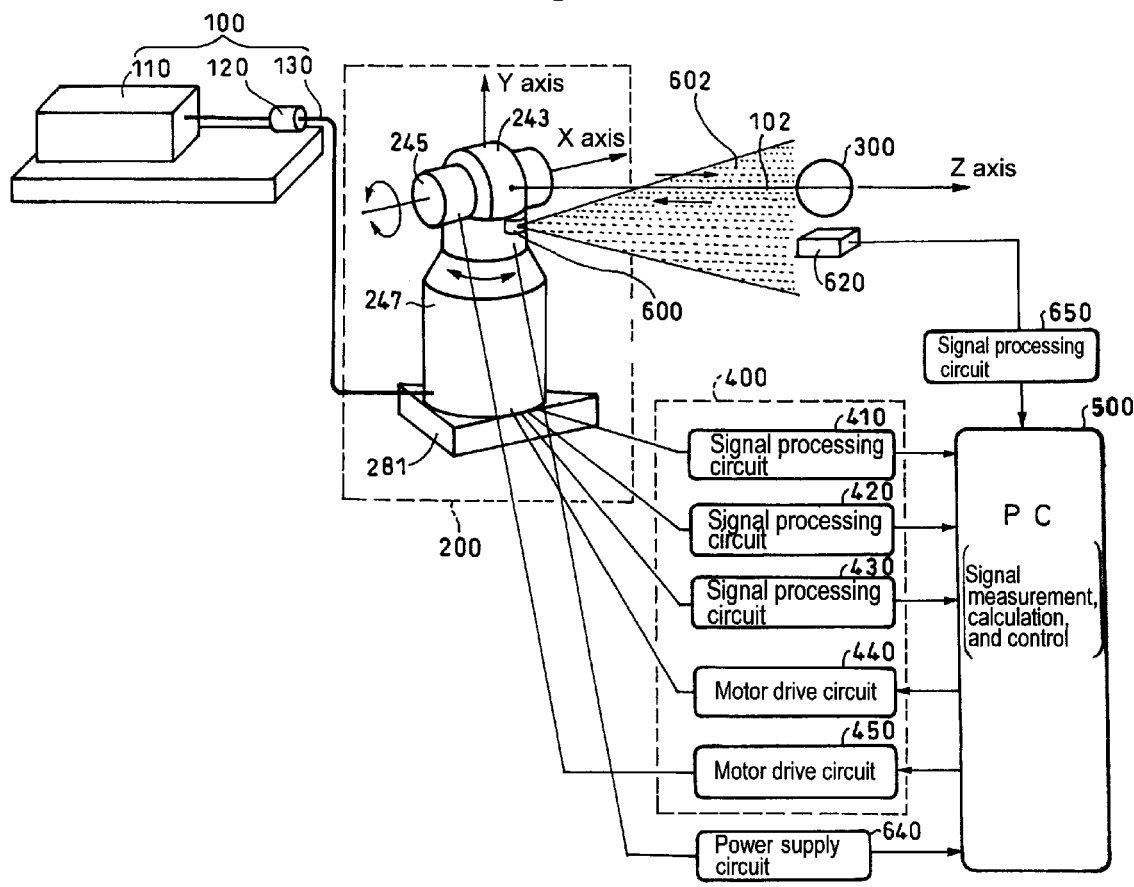
FIG. 3 is a perspective view showing the entire configuration of a tracking type laser interferometer according to Embodiment 1 of the present invention.
Figure 4:
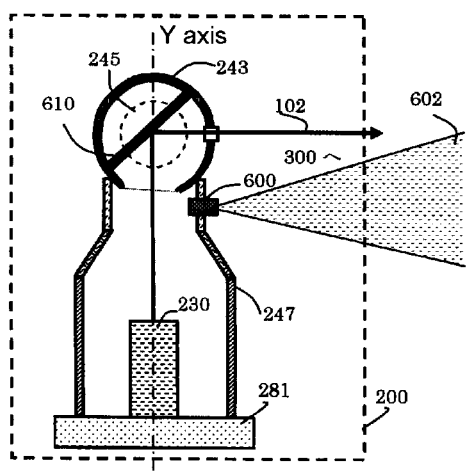
FIG. 4 is a brief sectional view of the main body portion of a tracking type laser interferometer, which shows the position of the same interferometer.

First, a description is given of Embodiment 1 of the present invention using FIG. 3 and FIG. 4. FIG. 3 is a perspective view showing the entire configuration of a tracking type laser interferometer according to the present embodiment, and FIG. 4 is a brief sectional view of the main body portion of a tracking type laser interferometer, which shows the position of the same interferometer.

As shown in FIG. 3, the present embodiment is provided with a light source portion 100, a main body portion 200, a retroreflector 300, a circuit portion 400, and a PC 500, which are main components of a conventional homodyne tracking type laser interferometer, and is further provided with a light irradiator 600, and a reflector 610 (not illustrated), which are characteristic components of the present embodiment, in the main body portion 200, and further includes a light receptor 620, a power supply circuit 640, and a signal processing circuit 650. Hereinafter, although a description is omitted of the conventional components, a description is given of the functions of the above-described elements and changes in the conventional components.

The light irradiator 600 is attached to the substrate side of the elevation angle motor 245 above the azimuth angle motor 247 that is a component of the two-axis turning mechanism 240 as shown in FIG. 3. Here, the light irradiator 600 is, for example, a line laser, and may have such a feature that emitted laser light is widened to be fan-shaped in the Y-axis direction. And, since the light irradiator 600 is attached to the substrate side of the elevation angle motor 245 so that the fan-shaped laser light 602 includes the optical axis of the laser beam 102 emitted from the main body portion 200, the light irradiator 600 is interlocked with turning of the azimuth angle motor 247, that is, is interlocked with turning movements around the Y-axis that is an axis orthogonal to the center axis of a fan shape of the fan-shaped laser light 602. Also, although the outlines of the azimuth angle motor 247 and the elevation angle motor 245 are different from the conventional outlines shown in FIG. 1, the functions and mutual arrangement are substantially identical to those of the prior art. Therefore, only by causing the azimuth angle motor 247 to turn and move, it becomes possible for the fan-shaped laser light 602 to be efficiently irradiated onto the retroreflector 300, wherein it is possible to readily grasp the position information with respect to the direction of the retroreflector 300.

Figure 1:
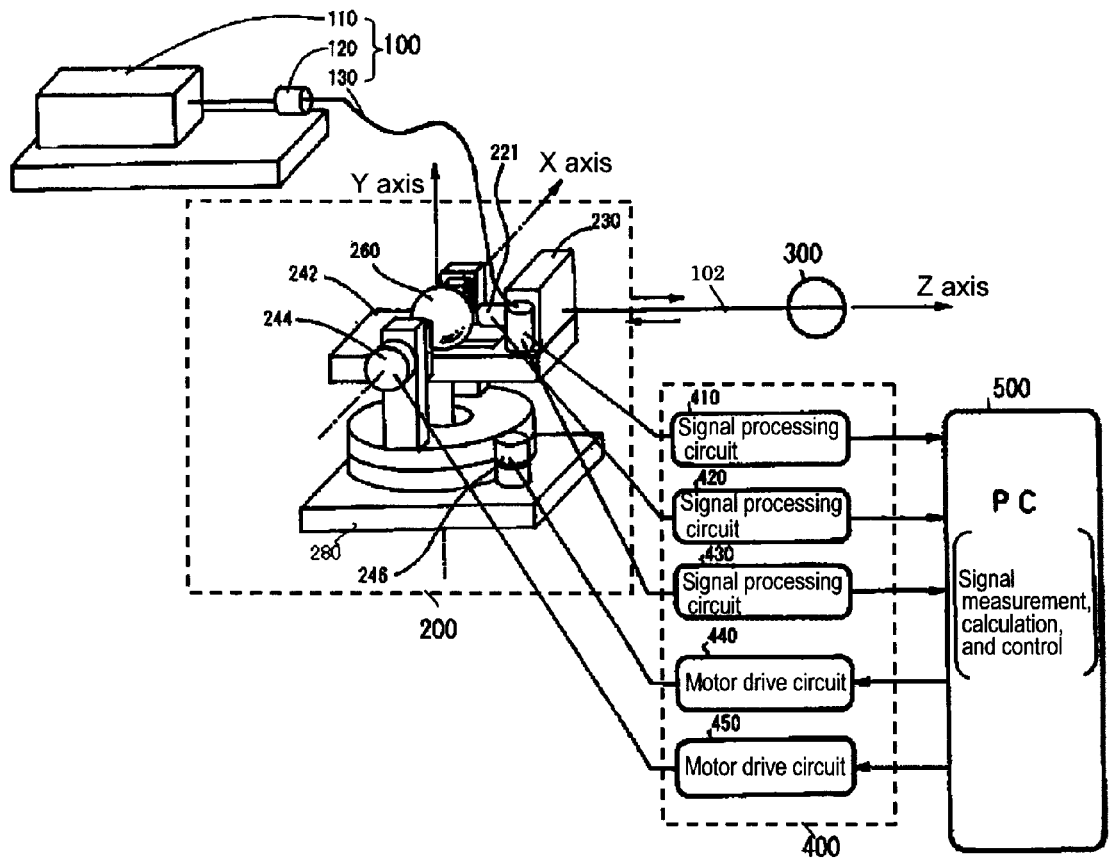
FIG. 1 is a perspective view showing the entire configuration of a conventional tracking type laser interferometer.
Figure 2:
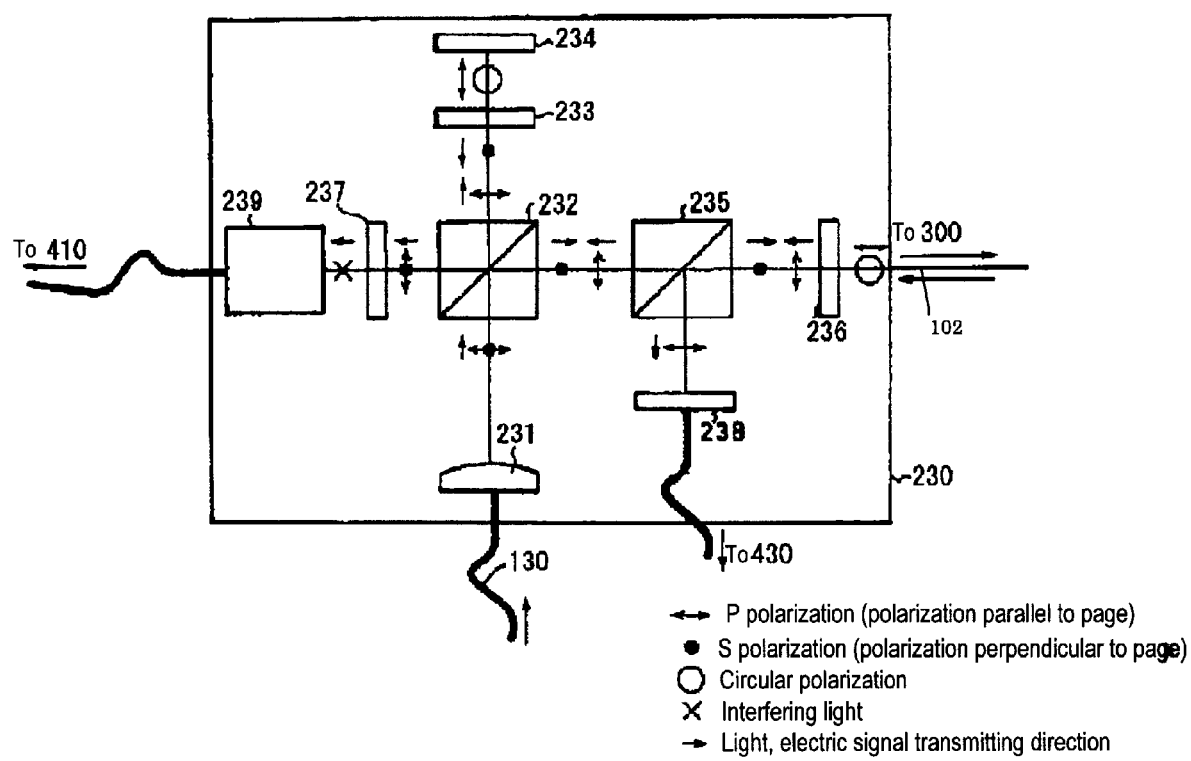
FIG. 2 is a brief configurational view of the same interferometer portion.

A description is given of the reflector 610 using FIG. 4. Also, in FIG. 4, the internal structure of the azimuth angle motor 247 and the elevation angle motor 245 is omitted for easy understanding, wherein only the outline thereof is shown. The reflector 610 has a function of reflecting a laser beam 102 emitted along the Y-axis from the interferometer 230 fixed at, for example, the base 281, and of emitting the same from the main body portion 200 toward the retroreflector 300. For example, a reflection mirror having high flatness and a prism may be used as the reflector 610. Herein, the reflector 610 is fixed on the carriage 243 so that the reflection surface of the reflector 610 comes to the center of the turning axis of elevation angle motor 245 and the azimuth angle motor 247, which exist on the Y-axis. In addition, since the main body portion 200 has such a structure as shown in FIG. 4, the reference sphere 260 shown in FIG. 1 is not provided in the present embodiment. Therefore, since the two-axis turning mechanism 240 does not incorporate the interferometer 230 and the displacement gauge 221, the two-axis turning mechanism 240 can be further downsized, wherein highly accurate control is enabled. Further, since no reference sphere 260 is used, the main body portion 200 can be further downsized.

The light receptor 620 has a light-receiving element. The light-receiving element has high sensitivity characteristics to the frequency (wavelength) of the fan-shaped laser light 620 of the light irradiator 600. For example, if the light irradiator 600 is a semiconductor laser, a photo diode (PD) having high sensitivity with respect to the semiconductor laser is used as the light-receiving element, wherein the azimuth angle may be determined even if the main body portion 200 is far from the retroreflector 300. And, although not illustrated in FIG. 3, the light-receiving body 620 is fixed and linked by means of jigs so that it becomes a specific positional relationship with the retroreflector 300, for example, so that it becomes the same azimuth angle when being observed from the main body portion 200, and if the retroreflector 300 moves, the light receptor 620 may also move. That is, at the stage when the fan-shaped laser light 602 of the light irradiator 600 is received, it is possible to quickly obtain the azimuth angle of the two-axis turning mechanism 200.

As shown in FIG. 3, the power supply circuit 640 is connected to the light irradiator 600, and has a function to control emission and stop of the fan-shaped laser light 602 of the light irradiator 600 by a signal from the PC 500. Therefore, it is possible to automatically control emission and stop of the fan-shaped laser light 602 by a signal from the PC 500.

As shown in FIG. 3, the signal processing circuit 650 is connected to the light receptor 620, and has a function to transmit a signal responsive to the intensity of received light to the PC 500 when it receives the fan-shaped laser light 602 of the light irradiator 600. Therefore, using the relationship between the drive signal to the motor drive circuit 440 and the receiving light intensity, it is possible to obtain the azimuth angle at high accuracy in the PC 500.

Next, a description is given of a resetting procedure according to the present embodiment.

First, if an obstacle, etc., exists between the main body portion 200 and the retroreflector 300 and the laser beam 102 is interrupted, the light amount detected by the QPD 238 in the interferometer 230 becomes zero (0). Then, the QPD 238 transmits a signal of light quantity 0 to the PC 500 via the signal processing circuit 430. The PC 500 judges based on the signal that the laser beam 102 from the interferometer 230 is interrupted, the PC 500 stops tracking control of the tracking type laser interferometer by the two-axis turning mechanism 240 by means of the motor drive circuits 440 and 450. Simultaneously, measurement of displacement by output of the detector 239 is discontinued.

Next, the PC 500 transmits a signal to the power supply circuit 640, the power supply of the light irradiator 600 is turned on, and a fan-shaped laser beam 602 is emitted.

Next, the PC 500 transmits a signal to the motor drive circuit 440, and causes the azimuth angle motor 247 to turn the azimuth angle. At the same time, the PC 500 commences measurement of signals transmitted from the light receptor 620 via the signal processing circuit 650. And, if the stop condition at which the light amount exceeds a threshold value defined in advance with respect to the light amount detected by the light receptor 620 is met, the azimuth angle is stopped and maintained at the position (the first turning angle) of a turning angle that satisfies the stop condition. And, the PC 500 transmits a signal to the power supply circuit 640 and turns off the power supply of the light irradiator 600. At the same time, the PC 500 discontinues measurement of the signals from the light receptor 620.

Finally, the PC 500 transmits a signal to the motor drive circuit 450, and causes the elevation angle to be turned by the elevation angle motor 245. Then, the elevation angle is stopped and maintained at the position (the second turning angle) of a turning angle at which the QPD 238 in the interferometer 230 can detect the light amount. In this state, the light amount is detected by the QPD 238 by a laser beam 102 emitted from the main body portion 200 and reflected by the retroreflector 300, wherein by measuring the tracking errors $\Delta TrX$ and $\Delta TrY$, it becomes possible to re-start tracking control of a normal tracking type laser interferometer.

Thus, since the tracking type laser interferometer can be controlled and reset by respective input signals on the PC 500, the tracking type laser interferometer can be fully automatically reset without depending on any manual operation when no tracking becomes available due to a reason such as interruption of the laser beam 102 emitted from the main body portion 200. Therefore, initial adjustment work when commencing measurement, which causes similar situations, can be automated. Accordingly, since environmental fluctuations due to intervention of a human being can be prevented, further accurate and stable measurement can be carried out.

Since the method of measurement and tracking based on the tracking type laser interferometer is identical to that of the prior arts, a description thereof is omitted.

Therefore, without adding and modifying the components to a large degree in comparison with a conventional homodyne tracking type laser interferometer, automatic resetting operation of the tracking type laser interferometer can be achieved by the present embodiment in addition to a displacement measurement function of a prior art homodyne tracking type laser interferometer.

Also, in the present embodiment, the above-described stop condition may be used as the maximum value of light amount to be detected. In brief, the stop condition may be a condition for turning and moving the laser beam to the angular range where tracking control is made possible.

In addition, in the present embodiment, the light receptor 620 may include a lens. By utilizing the light condensing action of a lens, it becomes possible for the light-receiving element to obtain a sufficient light amount even if the retroreflector 300 is far from the main body portion 200.

Figure 5:
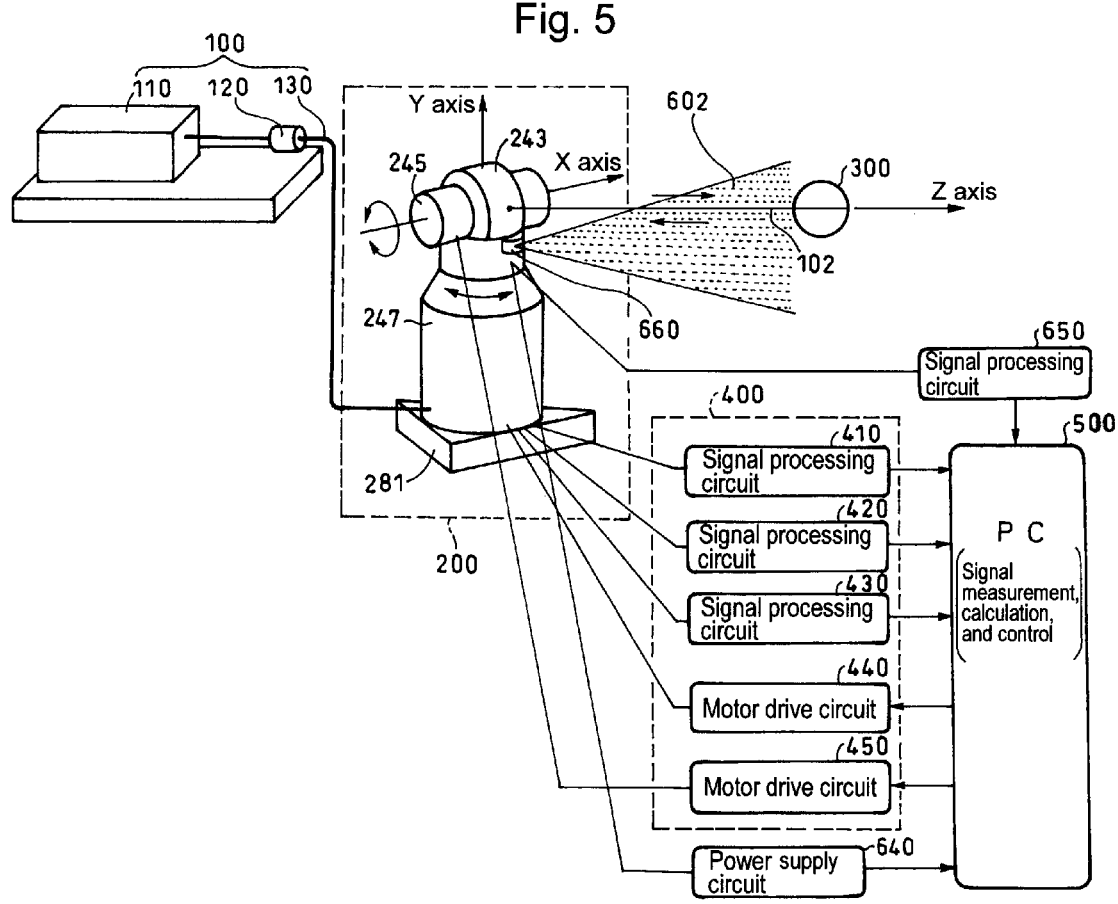
FIG. 5 is a perspective view showing the entire configuration of a tracking type laser interferometer according to Embodiment 2 of the present invention.
Figure 6:
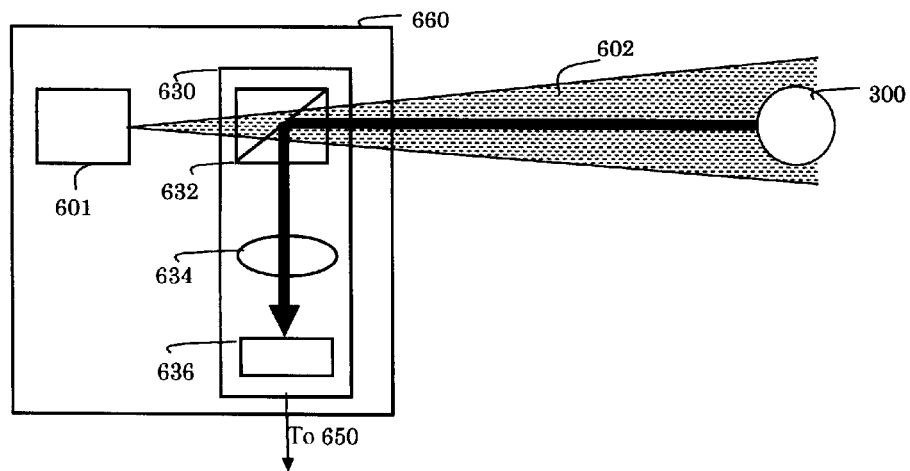
FIG. 6 is a brief configurational view showing a light detector of the same interferometer.

Next, a description is given of Embodiment 2 of the present invention, using FIG. 5 and FIG. 6. FIG. 5 is a perspective view showing the entire configuration of a tracking type laser interferometer according to the present embodiment, and FIG. 6 is a brief configurational view showing a light detector of the same interferometer.

As shown in FIG. 5, the present embodiment is provided with a light source portion 100, a main body portion 200, a retroreflector 300, a circuit portion 400, and a PC 500, which are main components of a conventional homodyne tracking type laser interferometer, and is further provided with a light detector 660, and a reflector 610 (not illustrated), which are characteristic components of the present embodiment, in the main body portion 200, and further includes a power supply circuit 640 and a signal processing circuit 650. That is, in the present embodiment, the light detector 660 is provided instead of the light irradiator 600 and the light receptor 620, which are described in Embodiment 1.

First, a description is given below of the light detector 660 differing from Embodiment 1 and of modification points in line therewith. A description is omitted of the elements and functions that are identical to those of Embodiment 1.

The light detector 660 is mounted at the substrate side of the elevation angle motor 245 above the azimuth angle motor 247, which are components of the two-axis turning mechanism which is identical to that of Embodiment 1. That is, the fan-shaped laser light 602 emitted from the light detector 660 is interlocked with turning of the azimuth angle motor 247. And, the light detector 660 includes a light irradiator 601 and a light receptor 630 as shown in FIG. 6. The light receptor 630 has, for example, a beam splitter (BS) 632, a lens 634 and a light-receiving element 636.

The light irradiator 601 differs from the light irradiator 600 only in that light is emitted via the BS 632. In other points, the light irradiator 601 is substantially identical to the light irradiator 600 according to Embodiment 1. And, since the positional relationship between the fan-shaped laser light 602 and the main body portion 200 is as described in Embodiment 1, a description thereof is omitted.

The function of the light receptor 630 is similar to the light receptor 620 described in Embodiment 1. However, since the optical axis in the emission direction of the fan-shaped laser light 602 to the retroreflector 300 and that in the incident direction of light reflected by the retroreflector 300 are made the same up to the main body portion 200, the light receptor 630 uses the BS 632 as a component. Also, in comparison with Embodiment 1, since attenuation of the fan-shaped laser light 602 is great, the lens 634 is also used as a component in order to gain the amount of light received by the light-receiving element 636.

Next, a description is given of actions of the light detector 660. As the fan-shaped laser light 602 is emitted from the light irradiator 601, the fan-shaped laser light 602 passes through the BS 632 of the light receptor 630 and is reflected by the retroreflector 300. The reflected and returned fan-shaped laser light 602 is reflected by the BS 632, and is condensed by the lens 634, and is detected by the light-receiving element 636.

Since the resetting procedure according to the present embodiment 2 is substantially identical to that according to Embodiment 1, a description thereof is omitted.

Therefore, in the present embodiment, effects similar to those obtained by Embodiment 1 can be obtained. In addition, since the emission portion of the fan-shaped laser light 602 and the light-receiving portion thereof are integrated into one, further downsizing is enabled. Also, since it is not necessary that the light receptor 620 is mounted at the retroreflector 300, a higher degree of freedom in arrangement and movement of the retroreflector 300 can be secured.

Further, although the optical axis of the light irradiator 601 and the optical axis of the light receptor 630 are commonly used to the BS 632, the resetting operation of the tracking type laser interferometer according to the present invention is enabled if a constant positional relationship between the light irradiator 601 and the light receptor 630 is taken into consideration even if the light irradiator 601 and the light receptor 630 are provided at far positions on the two-axis turning mechanism. Such a configuration is included in the present invention.

As described above, in Embodiments 1 and 2, the fan shape of the fan-shaped laser light 602 is turned centering around the Y-axis so as to be diffused on the YZ plane centering around the Z-axis. However, it is also included in the present invention that the fan shape thereof is turned centering around the X-axis by utilizing the fan shape diffused on the XZ plane centering around the Z-axis. That is, in the case of the above-described embodiments, when carrying out automatic resetting operation, the light irradiator or the light receptor is mounted on the carriage that turns by the elevation angle motor, the elevation angle motor is first turned with the azimuth angle motor not first turned, and next the azimuth angle motor is turned.

In addition, in the present invention, although the line laser used for the light irradiator is a semiconductor laser, etc., it may be another laser, for example, a solid-state laser or a gas laser, etc. Also, the frequency thereof may not be limited.

Also, there are many ways to generate fan-shaped laser light. In the present invention, the generation method may not be limited in the present invention.

Further, the light-receiving element used for the light receptor is not limited to the PD. For example, a line type or an area type optical position detection element (PSD) may be included in the present invention.

Also, although the above-described embodiments are not applied to a tracking type laser interferometer in which a reference sphere is used, the effects of the present invention can be achieved in the interferometer using a reference sphere, and the present invention may be applicable to the tracking type laser interferometer described in Patent Documents 1, 2 and 3.

In addition, as long as the interferometer is a tracking type laser interferometer, the present invention can be achieved by incorporating the light irradiators 600, 601 and the light receptor 620,630, etc. Therefore, it is clear that the interferometer is not limited to the homodyne tracking type laser interferometer, for example, the present invention may be applicable to a tracking type laser interferometer including a heterodyne tracking type laser interferometer.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the present invention.

What is claimed is:

1. A tracking type laser interferometer that detects displacement of a retroreflector being an object to be measured by utilizing interference of a laser beam that defines a Z axis and is irradiated onto the retroreflector and reflected by the retroreflector in the returning direction, and carries out tracking by means of a two-axis turning mechanism using displacement in the position of an optical axis of the laser beam;

wherein the two-axis turning mechanism comprises a combination of two one-axis turning mechanisms, being driven by a first and a second motor that rotate to define a Y axis and an X axis, respectively;

the same tracking type laser interferometer, comprising;

a light irradiator that emits a fan-shaped laser light with a center axis, wherein the fan-shaped laser light includes the optical axis of the laser beam and the light irradiator is disposed between the first and the second motor of the two-axis turning mechanism, and wherein the light irradiator is interlocked with turning movements of the two-axis turning mechanism such that the center axis of the fan-shaped laser light and the laser beam share a plane that is orthogonal to the X axis so as to be aligned with the Y axis a light receptor that has a specific positional relationship with the retroreflector or the light irradiator and receives the fan-shaped laser light; and a PC that instructs the two-axis turning mechanism to stop tracking the retroreflector when an amount of light from the laser beam detected by a quadruplicate divisional photo diode of the interferometer becomes 0, wherein the PC also stops measuring the displacement of the retroreflector and instructs the light irradiator to emit the fan-shaped laser light when the amount of light from the laser beam that is detected by the quadruplicate divisional photo diode becomes 0.

2. The tracking type laser interferometer according to claim 1, wherein the light receptor is provided in the retroreflector.

3. The tracking type laser interferometer according to claim 1, wherein the light receptor is provided in the two-axis turning mechanism.

4. The tracking type laser interferometer according to claim 3, wherein the light receptor is fixed so that the optical axis of the fan-shaped laser light when the fan-shaped laser light is emitted to the retroreflector and the optical axis when the laser light is reflected by the retroreflector and is received by the light receptor are common to each other at least on a part of the optical path.

5. The tracking type laser interferometer according to claim 3, wherein the light irradiator and a light detector including the light receptor is provided in the two-axis turning mechanism.

6. A method for resetting a tracking type laser interferometer that detects displacement of a retroreflector being an object to be measured by utilizing interference of a laser beam that defines a Z axis and is irradiated onto the retroreflector, and is reflected by the retroreflector in the returning direction, and carries out tracking by means of a two-axis turning mechanism using a change in the position of the optical axis of the laser beam, wherein the two-axis turning mechanism comprises a combination of two one-axis turning mechanisms, being driven by a first and a second motor that rotate to define a Y axis and an X axis, respectively; the method comprising the steps of:

emitting a fan-shaped laser light with a center axis, the fan-shaped laser light including the optical axis of the laser beam from a light irradiator disposed between the first and the second motor of the two-axis turning mechanism when no tracking control is carried out, wherein the center axis of the fan-shaped laser light and the laser beam share a plane that is orthogonal to the X axis so as to be aligned with the Y axis;

executing a turning movement around the Y axis which is orthogonal to the fan-shaped center axis of the two-axis turning mechanism;

detecting the fan-shaped laser light in a light receptor having a specific positional relationship with the retroreflector or the light irradiator;

obtaining a first turning angle by which tracking control is enabled;

moving to the first turning angle by turning around the Y axis which is orthogonal to the center axis of the fan shape;

executing turning movements of the X axis with the first turning angle maintained;

detecting the laser beam;

obtaining a second turning angle by which tracking control is enabled; and moving to the second turning angle by turning around the X axis so as to enable the tracking control, wherein when an amount of light from the laser beam that is detected by a quadruplicate divisional photo diode of the interferometer becomes 0, the tracking control is stopped and the light irradiator emits the fan-shaped laser light, and wherein measuring of the displacement of the retroreflector is also stopped when the amount of light from the laser beam that is detected by the quadruplicate divisional photo diode becomes 0.

7. The method for resetting a tracking type laser interferometer according to claim 6, wherein the light receptor is provided in the retroreflector.

8. The method for resetting a tracking type laser interferometer according to claim 6, wherein the light receptor is provided in the two-axis turning mechanism.

9. The method for resetting a tracking type laser interferometer according to claim 8, wherein the light receptor is fixed so that the optical axis of the fan-shaped laser light when the fan-shaped laser light is emitted to the retroreflector and the optical axis when the laser light is reflected by the retroreflector and is received by the light receptor are common to each other at least on a part of the optical path.

10. The method for resetting a tracking type laser interferometer according to claim 8, wherein the light irradiator and a light detector including the light receptor is provided in the two-axis turning mechanism.

* * * * *